(12) United States Patent
Murphy et al.

(10) Patent No.: US 12,009,701 B2
(45) Date of Patent: Jun. 11, 2024

(54) ELECTRIC MACHINES HAVING A RADIALLY EMBEDDED PERMANENT MAGNET ROTOR AND METHODS THEREOF

(71) Applicant: Regal Beloit America, Inc., Beloit, WI (US)

(72) Inventors: Emma Murphy, Columbus, OH (US); Matthew Scott, Dayton, OH (US); Stephen English, Englewood, OH (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 17/711,484

(22) Filed: Apr. 1, 2022

(65) Prior Publication Data

US 2023/0318377 A1    Oct. 5, 2023

(51) Int. Cl.
*H02K 1/28* (2006.01)
*H02K 1/276* (2022.01)
*H02K 15/03* (2006.01)

(52) U.S. Cl.
CPC ............. *H02K 1/28* (2013.01); *H02K 1/2773* (2013.01); *H02K 15/03* (2013.01)

(58) Field of Classification Search
CPC ........ H02K 1/28; H02K 1/2773; H02K 15/03; H02K 1/30
See application file for complete search history.

(56) References Cited

U.S. PATENT DOCUMENTS

| | | | |
|---|---|---|---|
| 6,603,232 B2 | 8/2003 | Van Dine et al. | |
| 6,933,645 B1 | 8/2005 | Watson | |
| 7,936,102 B2 | 5/2011 | Pabst et al. | |
| 10,742,082 B2 | 8/2020 | Maki-Ontto et al. | |
| 2008/0048517 A1 | 2/2008 | Ochiai et al. | |
| 2008/0197736 A1 | 8/2008 | Himmelmann et al. | |
| 2020/0259378 A1* | 8/2020 | Ueda ...................... | H02K 15/03 |

* cited by examiner

*Primary Examiner* — Christopher M Koehler
*Assistant Examiner* — Riley Owen Stout
(74) *Attorney, Agent, or Firm* — Armstrong Teasdale LLP (57) ABSTRACT

A rotor assembly for use in a radial flux electric motor assembly is provided. The rotor assembly includes a rotor core having a plurality of circumferentially spaced rotor poles and a plurality of magnets alternately spaced with the plurality of rotor poles. The plurality of rotor poles define a radial aperture between each pair of circumferentially adjacent rotor poles, and each radial aperture is configured to receive a magnet of the plurality of magnets therein. The rotor assembly further includes an end cap coupled to the rotor core and to the plurality of core magnets. The end cap includes a plurality of deformable members positioned between the rotor core and the plurality of magnets and configured to restrict movement of the plurality of magnets within the radial apertures. The deformable members are configured to deform upon insertion into a cavity defined between the rotor core and the plurality of magnets.

19 Claims, 9 Drawing Sheets

ELECTRIC MACHINES HAVING A RADIALLY EMBEDDED PERMANENT MAGNET ROTOR AND METHODS THEREOF

BACKGROUND

The field of the disclosure relates generally to electric motors, and more particularly, to radially embedded permanent magnet rotors and methods of reducing assembly cost and providing noise attenuation.

Radial flux electric machines generally include permanent magnets positioned within a rotor core, commonly referred to as an interior permanent magnet rotor. The rotor is formed from multiple laminations and circumferentially spaced poles. Slots are formed between adjacent poles, and magnets are inserted into the slots. In at least some known electric machines, the partially assembled rotor assemblies are then transported to a different facility to overmold the rotor assembly to secure the magnets within the slots. Such a transportation and manufacturing step increases the cost of the rotor assembly. Additionally, the overmolding is a hard plastic that does not provide noise attenuation and may result in an undesirable noise level during operation.

BRIEF DESCRIPTION

In one embodiment, a rotor assembly for use in a radial flux electric motor assembly is provided. The rotor assembly includes a rotor core having a plurality of circumferentially spaced rotor poles and a plurality of core magnets alternately spaced with the plurality of rotor poles. The plurality of rotor poles define a radial aperture between each pair of circumferentially adjacent rotor poles, and each radial aperture is configured to receive at least one core magnet of the plurality of core magnets therein. The rotor assembly further includes an end cap coupled to the rotor core and to the plurality of core magnets. The end cap includes a plurality of deformable members positioned between the rotor core and the plurality of magnets and configured to restrict movement of the plurality of magnets within the radial apertures. The deformable members are configured to deform upon insertion into a cavity defined between the rotor core and the plurality of magnets.

In another embodiment, an end cap for use in a rotor assembly of an electric machine is provided. The rotor assembly includes a plurality of rotor poles alternately spaced with a plurality of radial apertures for receiving a plurality of magnets therein. The end cap includes a disc, a first plurality of circumferentially spaced deformable members extending from the disc, and a second plurality of circumferentially spaced deformable members extending from the disc. The first plurality of deformable members are configured for positioning between the rotor core and the plurality of magnets to restrict circumferential movement of the plurality of magnets. The second plurality of deformable members are configured for positioning between the rotor core and the plurality of magnets to restrict radial movement of the plurality of magnets.

In yet another embodiment, a method of assembling a rotor assembly for use in a radial flux electric motor assembly is provided. The method includes inserting a plurality of magnets into a plurality of radial apertures defined between a plurality of circumferentially spaced rotor poles of a rotor core. The method also includes inserting a first plurality of deformable members of an end cap into a first plurality of cavities radially defined between a hub of the rotor core and the plurality of magnets. The method further includes inserting a second plurality of deformable members of the end cap into a second plurality of cavities defined between adjacent sides of the rotor poles and the magnets. The first plurality of deformable members and the second plurality of deformable members are configured to deform upon insertion to restrict movement of the plurality of magnets within the radial apertures.

DETAILED DESCRIPTION

Figure 1:
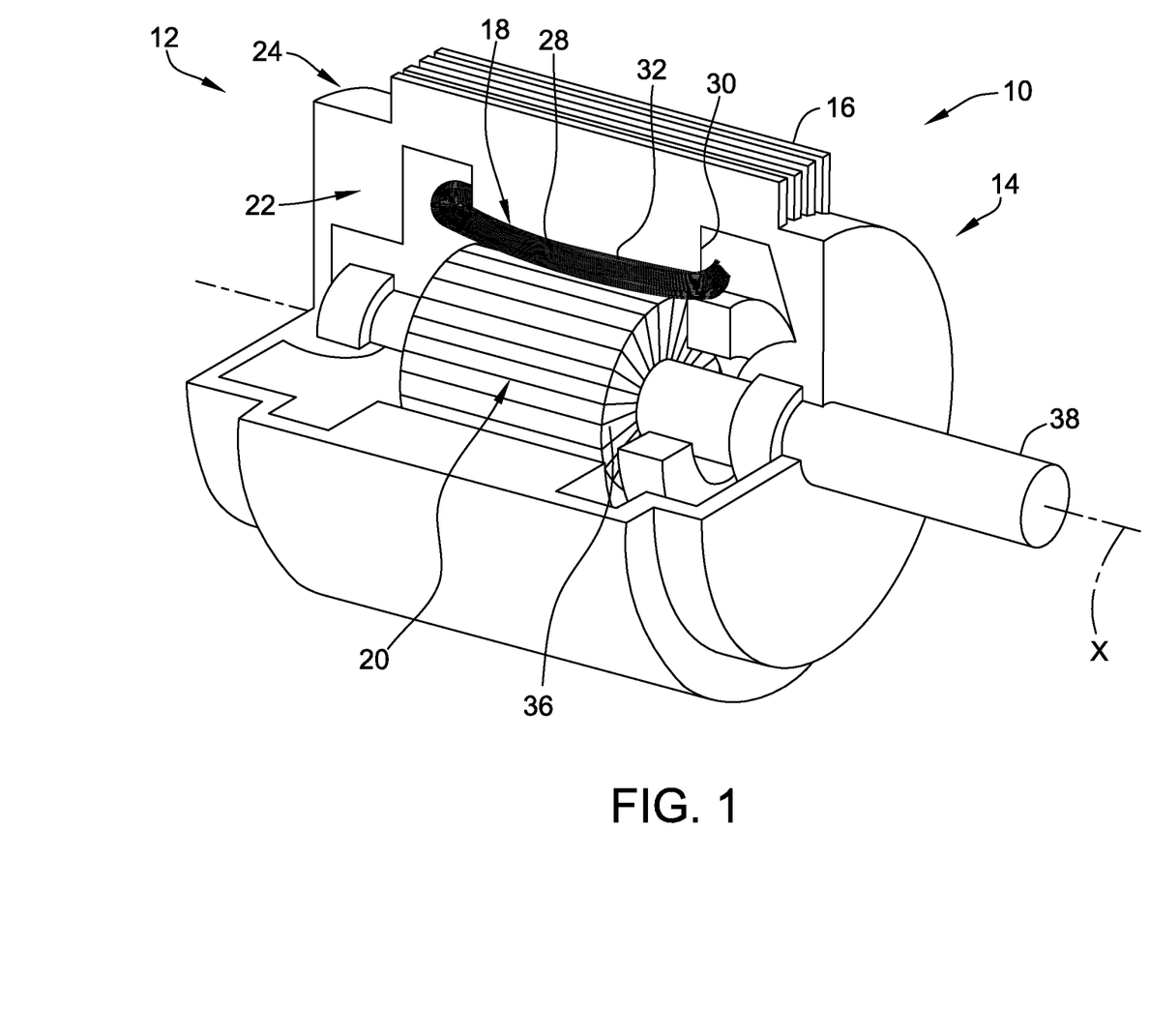
FIG. 1 is a perspective cut-away view of an exemplary electric motor assembly.

FIG. 1 is a perspective cut-away view of an exemplary electric motor 10. Although referred to herein as electric motor 10, electric motor 10 can be operated as either a generator or a motor. Electric motor 10 includes a first end 12, a second end 14, and a motor assembly housing 16. Electric motor 10 also includes a stator assembly 18 and a rotor assembly 20. Motor assembly housing 16 defines an interior 22 and an exterior 24 of motor 10 and is configured to at least partially enclose and protect stator assembly 18 and rotor assembly 20. Stator assembly includes a stator core 28, which includes a plurality of teeth 30 and a plurality of windings 32 wound around stator teeth 30. Furthermore, in an exemplary embodiment, stator assembly 18 is a three-phase salient pole stator assembly and stator core 28 is formed from a stack of laminations made of highly magnetically permeable material. Alternatively, stator assembly 18 is a single-phase salient pole stator assembly. Stator assembly 18 may be a substantially round, segmented, or roll-up type stator construction and windings 32 are wound on stator core 28 in any suitable manner that enables motor 10 to function as described herein. For example, windings 32 may be concentrated type or overlapped type windings.

Rotor assembly 20 includes a permanent magnet rotor core 36 and a shaft 38. In the exemplary embodiment, rotor core 36 is formed from a stack of laminations made of magnetically permeable material. Rotor core 36 is substantially received in a central bore of stator core 28 for rotation along an axis of rotation X. FIG. 1 illustrates rotor core 36 and stator core 28 as solid for simplicity. While FIG. 1 is an illustration of a three-phase electric motor, the methods and apparatus described herein may be included within motors having any number of phases, including single phase and multiple phase electric motors.

In the exemplary embodiment, electric motor 10 is coupled to a fan or centrifugal blower (not shown) for moving air through an air handling system, for blowing air over cooling or heating coils, and/or for driving a compressor within an air conditioning/refrigeration system. More specifically, motor 10 may be used in air moving applications used in the heating, ventilation, and air conditioning (HVAC) industry, for example, in residential applications using ⅕ horsepower (hp) to 1 hp motors. Alternatively, motor 10 may be used in fluid pumping applications. Motor 10 may also be used in commercial and industrial applications and/or hermetic compressor motors used in air conditioning applications, where motor 10 may have a rating of greater than 1 hp. Although described herein in the context of an air handling system, electric motor 10 may engage any suitable work component and be configured to drive such a work component.

Figure 2:
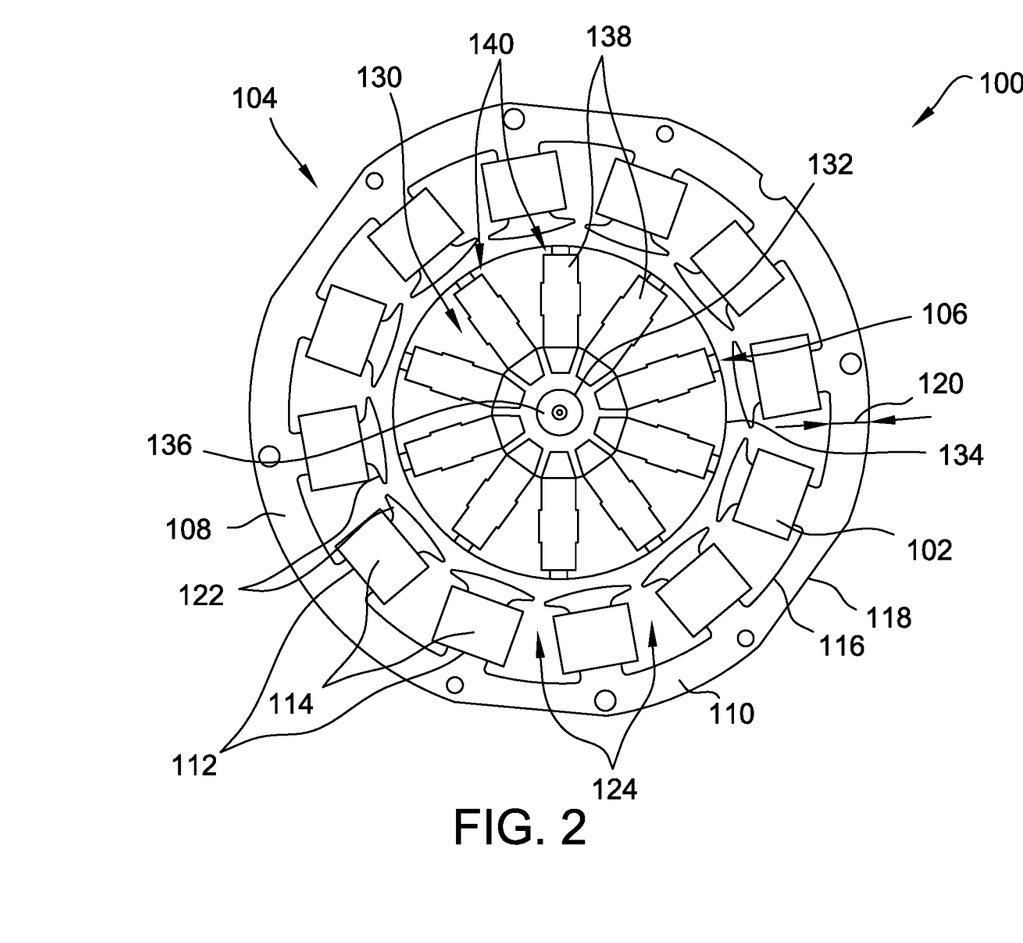
FIG. 2 is an end view of a stator assembly and a rotor assembly of the electric motor assembly shown in FIG. 1.

FIG. 2 is a cross-sectional end view of an exemplary electric motor 100 having a central axis 102 and that includes a stator assembly 104 and a rotor assembly 106. Stator assembly 104 includes an annular core 108 having a stator yoke or base 110 and a plurality of stator teeth 112 extending radially inward from base 110. In the exemplary embodiment, a plurality of windings 114 are wound around stator teeth 112 such that each tooth 112 includes a single winding 114. In other embodiments, stator assembly 104 includes one winding 114 for every other tooth 112.

Stator base 110 includes an inner surface 116 and an outer surface 118. Inner surface 116 and outer surface 118 extend about central axis 102 and are spaced radially apart. Inner surface 116 and outer surface 118 define a thickness 120 of base 110 therebetween. In alternative embodiments, stator assembly 104 includes any base 110 that enables motor assembly 100 to operate as described herein.

In addition, in the exemplary embodiment, stator teeth 112 extend radially from base 110. In some embodiments, stator teeth 112 are integral with base 110. In further embodiments, stator teeth 112 are coupled to base 110. In the exemplary embodiment, each stator tooth 112 includes a distal tip 122 that is positioned proximate rotor assembly 106.

In addition, in the exemplary embodiment, stator teeth 112 are spaced circumferentially about base 110 and define slots 124 therebetween. Stator teeth 112 are configured to receive conduction coils or windings 114 such that windings 114 extend around teeth 112 and through slots 124. In some embodiments, stator teeth 112 define no more than 24 slots. In the exemplary embodiment, stator assembly 104 includes eighteen stator teeth 112 defining eighteen slots 124. In alternative embodiments, motor assembly 100 includes any number of stator teeth 112, such as twelve, that enable motor assembly 100 to operate as described herein.

In some embodiments, stator assembly 104 is assembled from a plurality of laminations. Each of the plurality of laminations is formed in a desired shape and thickness. The laminations are coupled together to form stator assembly 104 having the desired cumulative thickness. In further embodiments, stator assembly 104 includes a first configuration, e.g., a flat or strip configuration, and a second configuration, e.g., a round configuration. Stator assembly 104 is moved or "rolled" from the first configuration to the second configuration to form a roll-up stator assembly 104 having a substantially cylindrical shape. In alternative embodiments, stator assembly 104 is assembled in any manner that enables stator assembly 104 to function as described herein.

With continued reference to FIG. 2, rotor assembly 106 includes a rotor core 130 having a hub portion 132, and a plurality of rotor poles 134 circumferentially spaced about hub portion 132. Hub portion 132 includes an opening configured to receive a rotatable shaft 136 therethrough that is couped to a load. In the exemplary embodiment, rotor core 130 also includes a plurality of core magnets 138 alternately spaced with the plurality of rotor poles 134. The plurality of rotor poles 134 define a radial aperture 140 between each pair of circumferentially adjacent rotor poles 134, and each radial aperture 140 is configured to receive at least one core magnet 138 therein.

Accordingly, in the exemplary embodiment, rotor assembly 106 is a spoked rotor and is configured to provide increased magnetic flux in comparison to at least some known rotor assemblies. Stator assembly 104 is configured to provide capacities for the increased magnetic flux and the increased hoop stress due to the increased magnetic flux. In alternative embodiments, motor assembly 100 includes any rotor assembly 106 that enables motor assembly 100 to operate as described herein.

Figure 3:
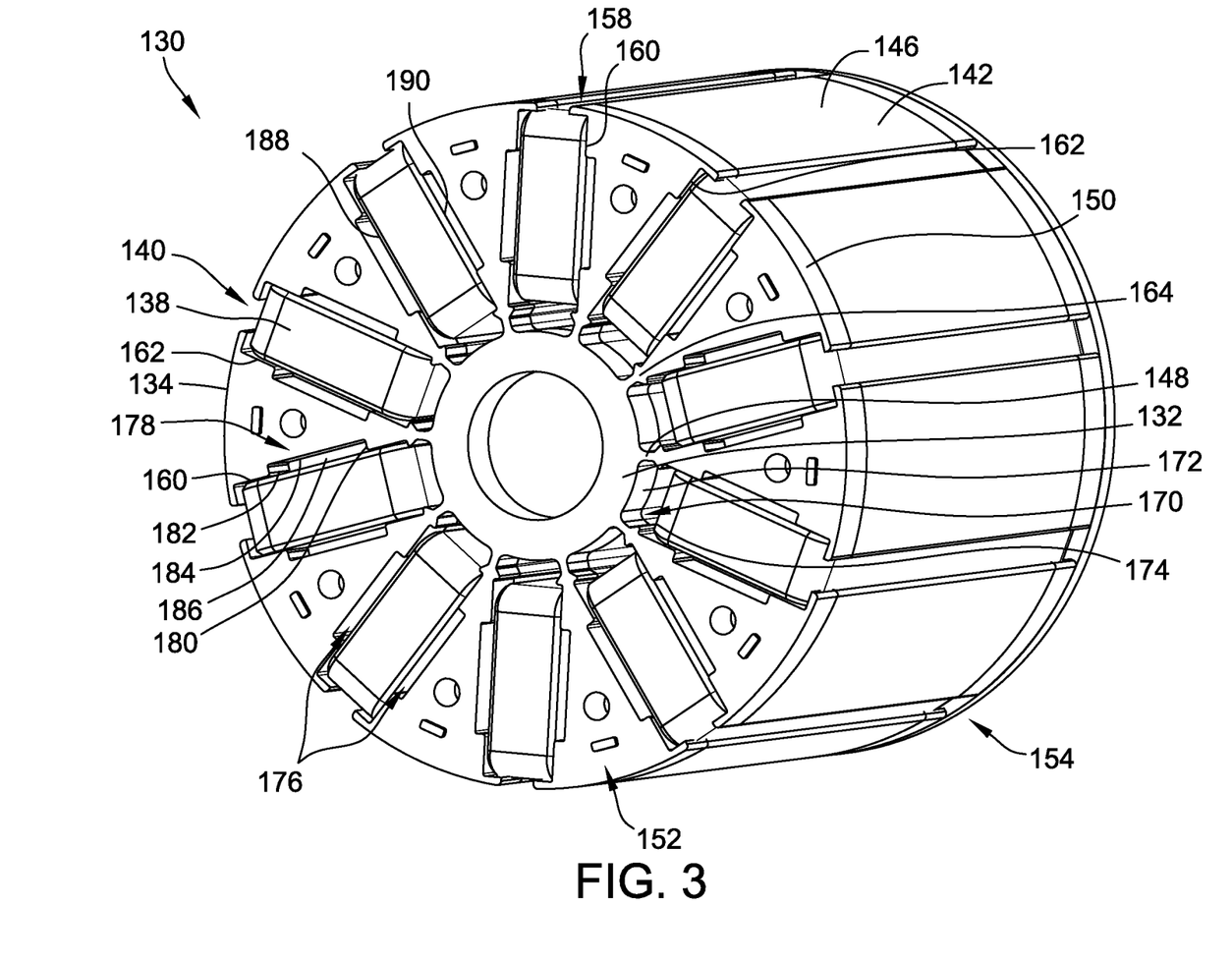
FIG. 3 is a perspective view of an exemplary rotor core that may be included within the electric motor assembly shown in FIG. 1.

FIG. 3 is a perspective view of rotor core 130 illustrating the plurality of rotor poles 134 that may be included within the radial flux electric motor assembly 100 shown in FIG. 2. In the exemplary embodiment, rotor assembly 106, also referred to as a radially embedded permanent magnet rotor, includes rotor core 130 and shaft 136. Examples of motors that may include the radially embedded permanent magnet rotors include, but are not limited to, electronically commutated motors (ECM's). ECM's may include, but are not limited to, brushless direct current (BLDC) motors, brushless alternating current (BLAC) motors, and variable reluctance motors. Furthermore, rotor assembly 20 is driven by an electronic control (not shown), for example, a sinusoidal or trapezoidal electronic control.

As shown in FIG. 3, in the exemplary embodiment, each rotor pole 134 is coupled to hub portion 132 by a web 148. In other embodiments, less than all of rotor poles 134 may be coupled to hub 132. Furthermore, in the exemplary embodiment, rotor core 130, and therefore each rotor pole 134, is formed by a plurality of stacked laminations 150 that are coupled together by interlocking, adhesive, welding, bolting, or riveting. For example, laminations 150 are fabricated from multiple punched layers of stamped metal such as steel.

Furthermore, in the exemplary embodiment, rotor core 130 includes the plurality of radial apertures 140 alternately spaced with rotor poles 134. Each radial aperture 140 is configured to receive one or more permanent magnets 138 such that each magnet 138 is radially embedded in rotor core 130 and extends at least partially from a rotor first end 152 to a rotor second end 154. In the exemplary embodiment, radial apertures 140 are generally rectangular. Alternatively, radial apertures 140 may have any suitable shape corresponding to the shape of the permanent magnets that enables electric motor to function as described herein. In the exemplary embodiment, permanent magnets 138 are ceramic magnets magnetized in a direction tangent to axis of rotation X. However, magnet 138 may be fabricated from any suitable material that enables motor 100 to function as described herein, for example, bonded neodymium, AlNiCo, sintered neodymium, bonded and ceramic ferrite, and/or samarium cobalt.

In the exemplary embodiment, the number of radial apertures 140 is equal to the number of rotor poles 134, and one magnet 138 is positioned within each radial aperture 140 between a pair of rotor poles 134. Although illustrated as including ten rotor poles 134, rotor core 130 may have any number of poles that allows motor 100 to function as described herein, for example, six, eight or twelve poles.

In the exemplary embodiment, each rotor pole 134 includes one or more permanent magnet retention member or protrusions. For example, a first pair of protrusions 158 is located proximate pole outer wall 146 along rotor outer edge 142 and extends into adjacent radial apertures 140 from circumferential side walls 160 and 162 of each pole 134. Each protrusion of the first pair of protrusions 158 is configured to facilitate retention of magnet 138 within radial aperture 140 by substantially preventing movement of magnet 138 in a radial direction towards outer edge 142. Further, a second pair of protrusions 164 is located proximate web 148 and extend adjacent radial apertures 140 from circumferential end walls 160 and 162. Each protrusion of the second pair of protrusions 164 is configured to facilitate retention of magnet 138 within radial aperture 140 by substantially preventing movement of magnet 138 in a radial direction towards shaft 136. Alternatively, rotor core 130 may have any number and location of protrusions 156 that enable rotor core 130 to function as described herein.

Still referring to FIG. 3, the rotor core 130 further includes a first plurality of cavities 170 formed radially between the hub 132 and the plurality of magnets 138. Specifically, each cavity 170 is defined radially by an outer periphery 172 of the hub 132 and an inner surface 174 of each magnet 138. Similarly, each cavity 170 is defined circumferentially by adjacent webs 148 of rotor core 130.

Additionally, the rotor core 130 includes a second plurality of cavities 176 defined between each pole 134 and an adjacent magnet 138. Specifically, each pole 134 includes a notch 178 defined in each of circumferential side surfaces 160 and 162. More specifically, each notch 178 is defined by a radially inner wall 180, a radially outer wall 182, and a sidewall 184 extending therebetween. Each of walls 180, 182, and 184 extend the same axial length to a shoulder 186 to define an axial depth of the notch 178. As shown in FIG. 3, each notch 178 is radially shorter in length than circumferential sides 160 and 162 of poles 134 and is also radially shorter in length than magnets 138. In the exemplary embodiment, each magnet 139 includes opposing circumferential sides 188 and 190 that combine with a corresponding adjacent notch 178 to define a cavity 176 of the second plurality of cavities 176.

Figure 4:
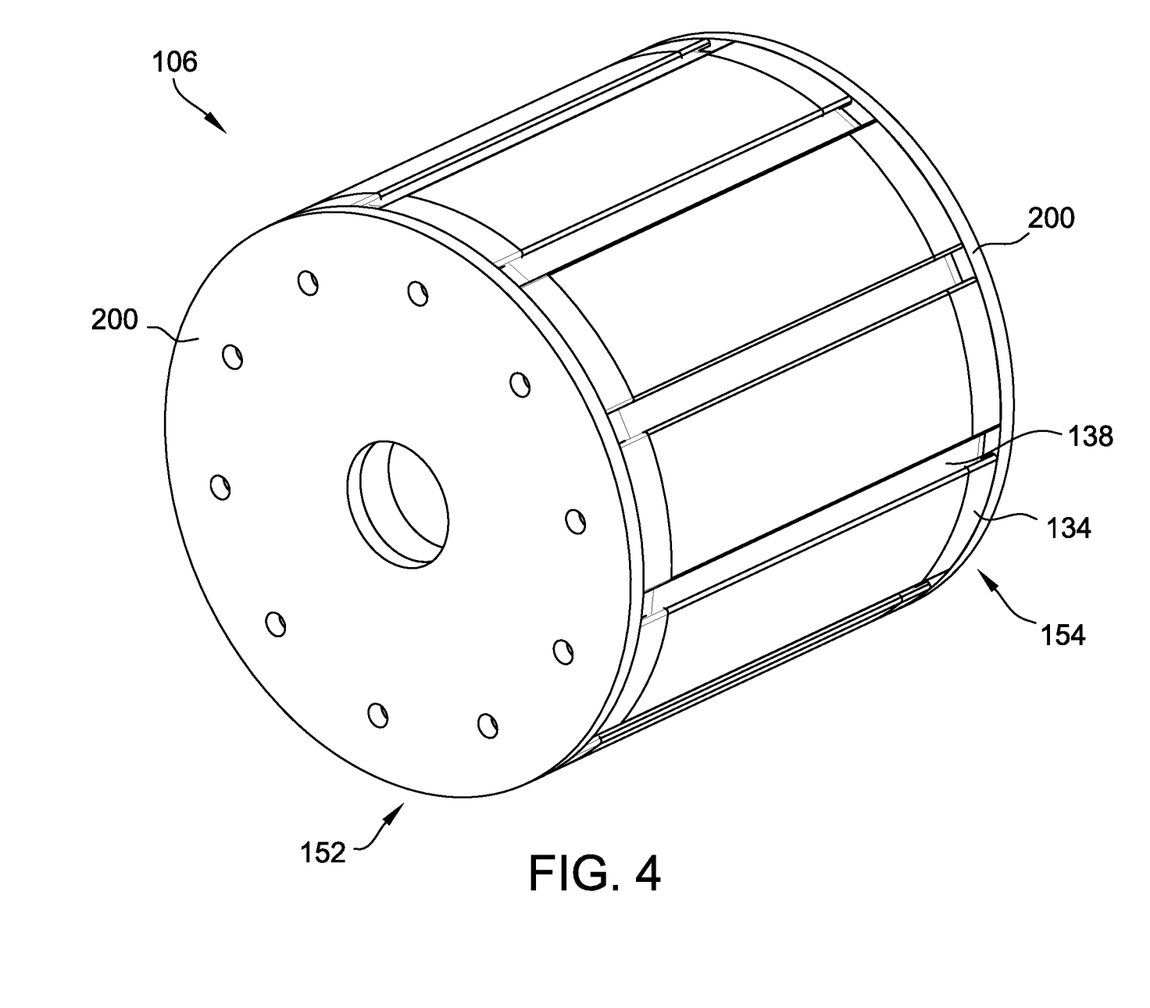
FIG. 4 is a perspective view of an exemplary rotor assembly that includes an exemplary end cap.
Figure 5:
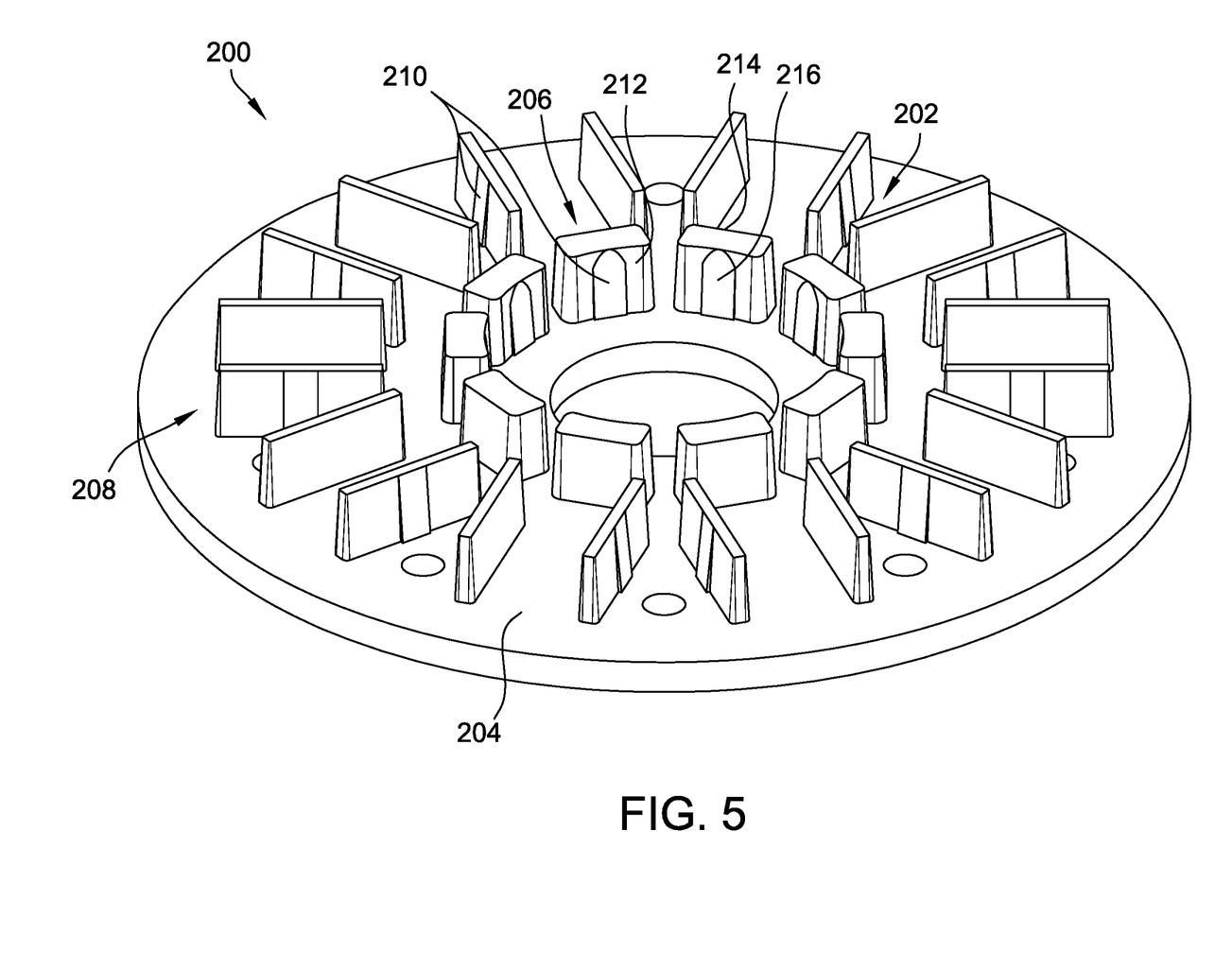
FIG. 5 is a perspective view of the end cap shown in FIG. 4.
Figure 6:
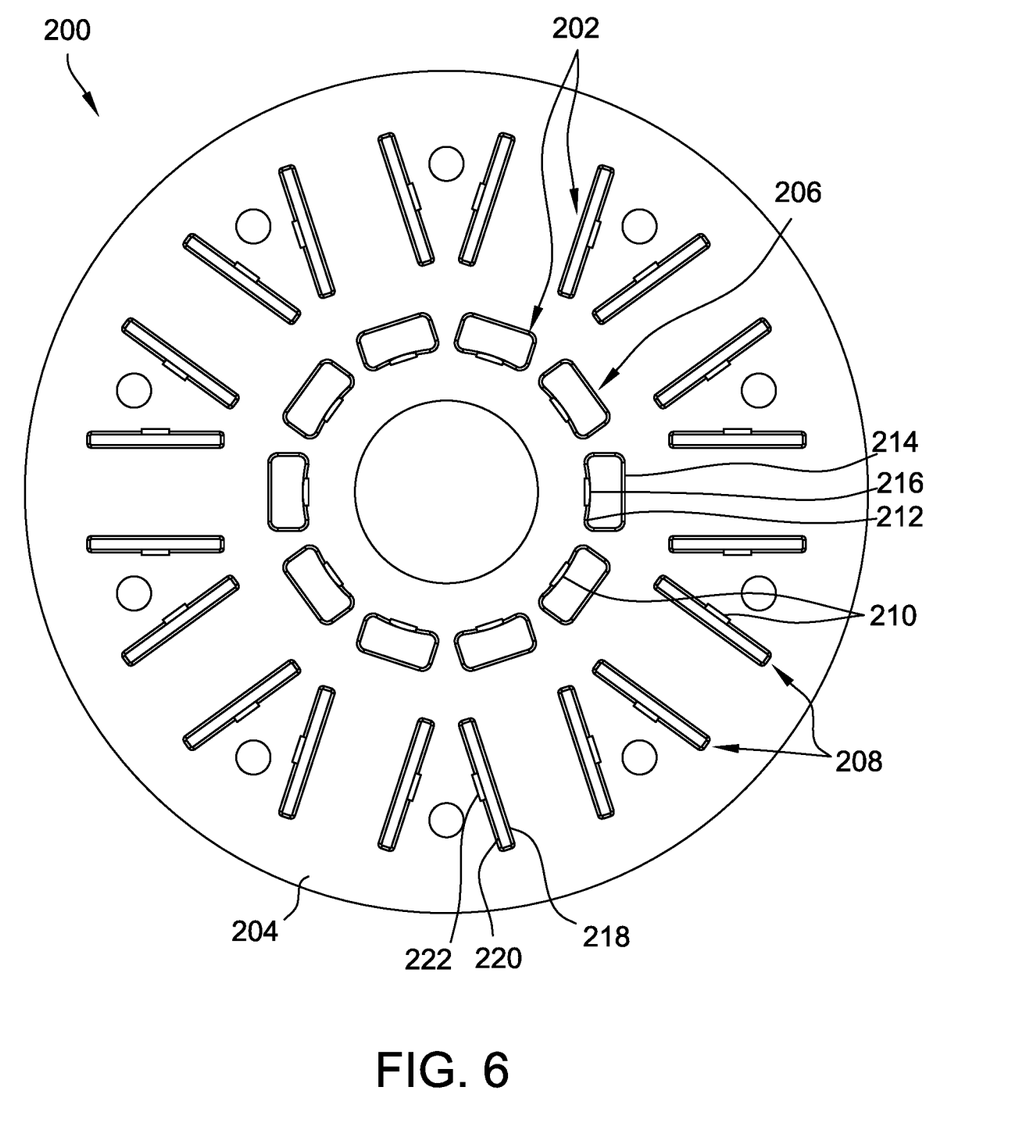
FIG. 6 is a top view of the end cap shown in FIG. 4.
Figure 7:
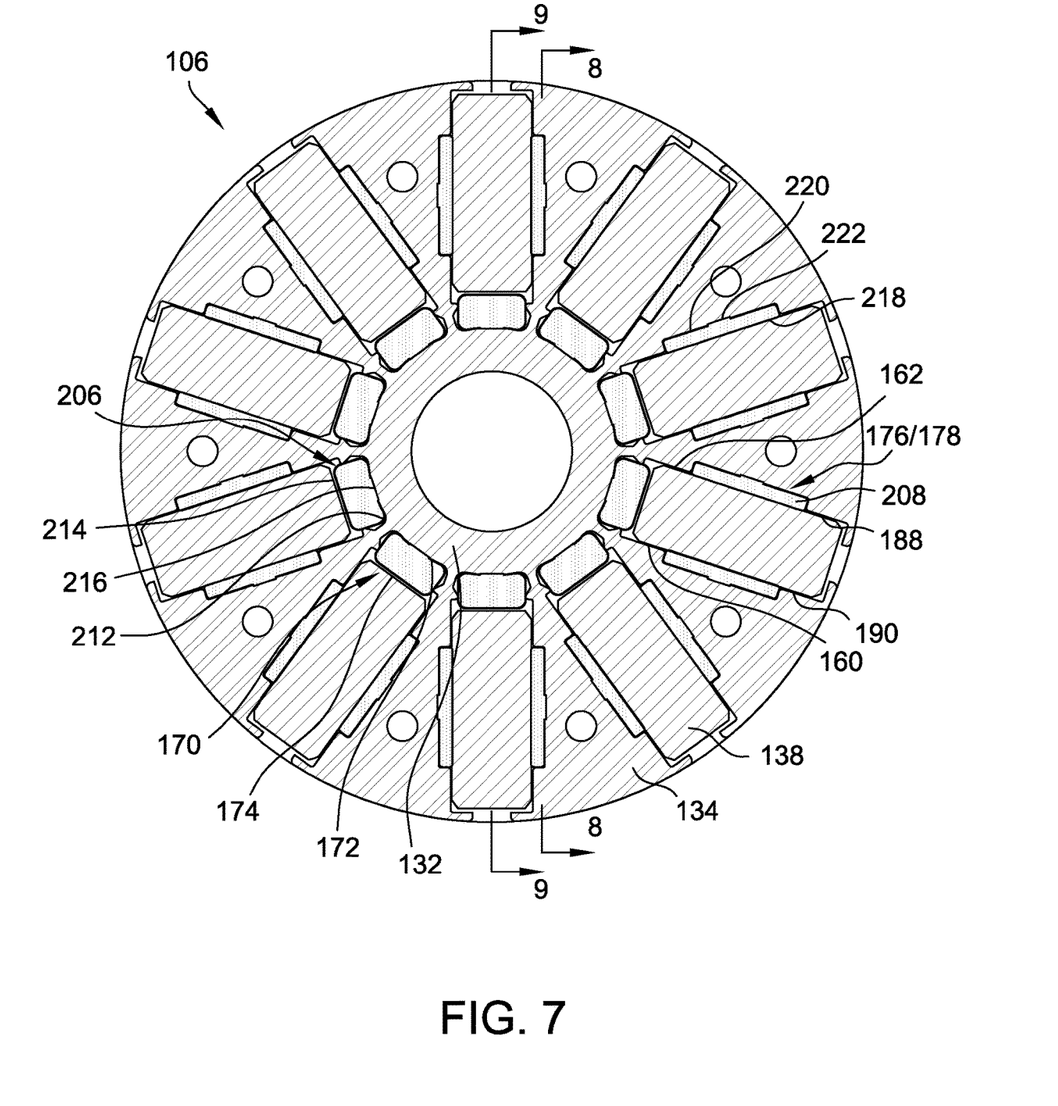
FIG. 7 is an end cross-sectional view of the rotor assembly shown in FIG. 4.
Figure 8:
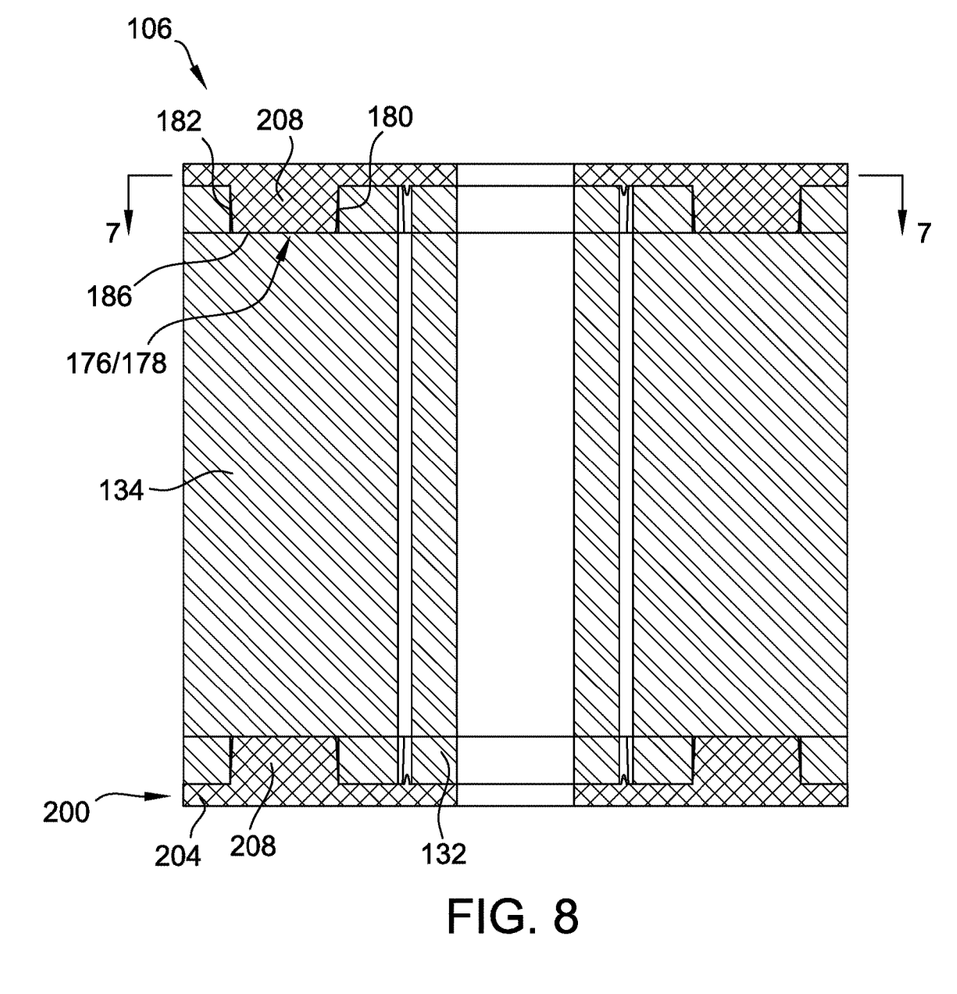
FIG. 8 is a side cross-sectional view of the rotor assembly shown in FIG. 4 illustrating one aspect of the end cap.
Figure 9:
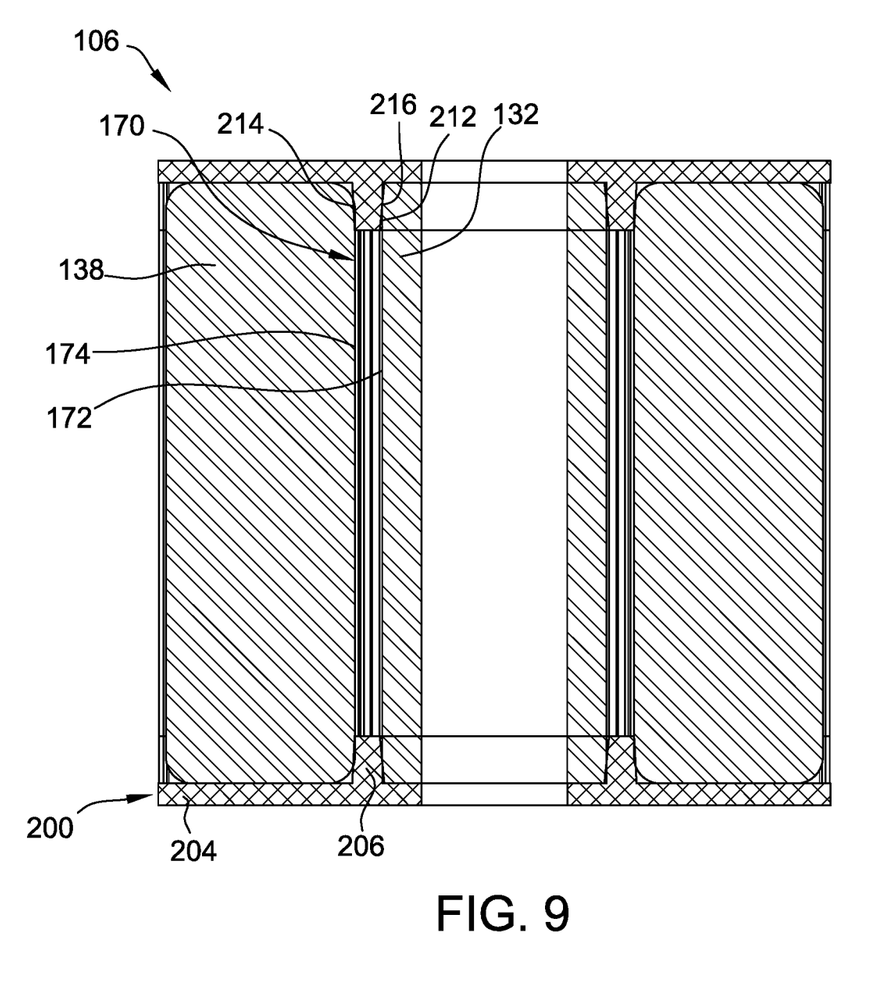
FIG. 9 is a side cross-sectional view of the rotor assembly shown in FIG. 4 illustrating another aspect of the end cap.

FIG. 4 is a perspective view of rotor assembly 106 that includes an end cap 200 coupled to each of ends 152 and 154. FIG. 5 is a perspective view of the end cap 200, and FIG. 6 is a top view of the end cap 200. FIG. 7 is an end cross-sectional view of the rotor assembly 106. FIG. 8 is a side cross-sectional view of the rotor assembly 106 taken along 8-8 shown in FIG. 7, and FIG. 9 is a side cross-sectional view of the rotor assembly 106 taken along 9-9 shown in FIG. 7.

In the exemplary embodiment, the end cap 200 is coupled to the rotor core 130 and to the plurality of magnets 138. End cap 200 includes a plurality of deformable members 202 positioned between the rotor core 130 and the plurality of magnets 138. The deformable members 202 restrict movement of the plurality of magnets 138 within the radial apertures 140. Specifically, the deformable members 202 are configured to deform upon insertion into the cavities 170 and 176 defined between the rotor core 130 and the plurality of magnets 138.

As shown in FIGS. 5 and 6, the end cap 200 includes a disc 204, a first plurality 206 of circumferentially spaced deformable members 202 extending from the disc 204, and a second plurality 208 of circumferentially spaced deformable members extending from the disc 204 and positioned radially outward of the first plurality 206 of deformable members 202. In the exemplary embodiment, each member 202 of the first plurality 206 is inserted into a corresponding cavity 170 of the first plurality of cavities and is operable to restrict radial movement of the magnet 138 positioned within the accompanying radial aperture 140. Similarly, each member 202 of the second plurality 208 is inserted into a corresponding cavity 176 of the second plurality of cavities and is operable to restrict circumferential movement of the magnet 138 positioned within the accompanying radial aperture 140.

In the exemplary embodiment, each member 202 of the first plurality 206 of deformable members and each member 202 of the second plurality 208 of deformable members includes a deformable portion 210 configured to engage the rotor core 130 and to deform upon insertion into the cavities 170 and 174 of the rotor core 130. Specifically, each member 202 of the first plurality 206 includes an arcuate radially inner surface 212 and a generally planar radially outer surface 214. The inner surface 212 further includes a deformable portion 216 for engaging the hub outer surface 172. In operation, when the first plurality 206 of members 202 are inserted into the first plurality of cavities 170, the deformable portion 212 contacts hub outer surface 172 and physically deforms to fit within the first cavity 170. Prior to insertion, each member 202 of the first plurality 206 defines a first radial length measured between the deformable portion 216 and the outer surface 214 that is larger than the radial length of the cavity 170 measured between the hub outer surface 172 and the magnet inner surface 174. After insertion, and after the deformable portion 216 has been deformed, or crushed, the first plurality 206 of members 202 define a second radial length measured between the crushed deformable portion 216 and the outer surface 214 that is smaller than the radial length of the cavity 170 to enable the members 202 of the first plurality 206 to fit within the cavities 170.

Similarly, each member 202 of the second plurality 208 includes a first circumferential side surface 218 and an opposing second circumferential side surface 220. The second surface 220 includes a deformable portion 222 for engaging the adjacent rotor pole 134. Specifically, the deformable portion 222 engages the sidewall 184 of the adjacent notch 178. In operation, when the second plurality 208 of members 202 are inserted into the second plurality of cavities 176, the deformable portion 222 contacts the sidewall 184 and physically deforms to fit within the second cavity 176. Prior to insertion, each member 202 of the second plurality 208 defines a first circumferential width measured between the deformable portion 222 and the first surface 218 that is larger than the circumferential width of the cavity 176 measured between the sidewall 184 and the magnet side surface 188/190. After insertion, and after the deformable portion 222 has been deformed, or crushed, the second plurality 208 of members 202 define a second circumferential width measured between the crushed deformable portion 222 and the second surface 218 that is smaller than the circumferential width of the cavity 176 to enable the members 202 of the second plurality 208 to fit within the cavities 176.

Furthermore, in order to facilitate ease of insertion of members 202 into cavities 170 and 176, members 202 are tapered such that they narrow in the direction of extension from the disc 204.

In the exemplary embodiment, the end cap is manufactured from a plastic material that enhances the noise attenuation features of the rotor assembly. Specifically, the end cap is injection molded from a plastic material as a monolithic piece and from a plastic material that is softer than plastics used to overmold other rotor assemblies. More specifically, rotor assemblies using the end cap described herein eliminated resonances at 800 Hz and reduced the decibel magnitude at 1600 Hz. Generally, end cap is made from any material that facilitates operation of the end cap as described herein. One advantage of using injection molding is that the end cap can be made anywhere and easily transported to where the rotor core is manufactured. As such, the use of the end cap as described herein allows the end cap to be shipped to the rotor core facility and negates the requirement of shipping the partially assembled rotor assemblies to an overmolding facility and then returning them to the rotor core facility.

Described herein are exemplary systems and apparatus that provide for magnet retention combined with noise attenuation within a rotor assembly. Specifically, overmolded rotor assemblies may generate an undesirable amount of noise due to small movements of the magnets within the apertures and also because the material used to overmold the rotor assembly does not dampen the noise. The end cap described herein includes deformable members that further restrict movement of the magnets within the radial apertures and is also manufactured from a softer plastic material than the known overmoding material such that noise generated by the rotor assembly is damped by the end cap and does not propagate outward. Additionally, as described above, the end cap may be manufactured offsite and shipped to the rotor manufacturing facility such that complete assembly of the rotor is enabled at a single site without the need to transport partially assembled rotors to an overmolding facility and then return them to the assembly facility.

Exemplary embodiments of rotor cores for electric machines are described above in detail. The electric motor and its components are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor assembly for use in a radial flux electric motor assembly, said rotor assembly comprising:
    a rotor core comprising a plurality of circumferentially spaced rotor poles;
    a plurality of magnets alternately spaced with said plurality of rotor poles, wherein said plurality of rotor poles define a radial aperture between each pair of circumferentially adjacent rotor poles, and wherein each radial aperture is configured to receive a magnet of said plurality of magnets therein; and
    an end cap coupled to said rotor core and to said plurality of magnets, wherein said end cap comprises a disc and a plurality of deformable members extending from said disc, wherein each deformable member of said plurality of deformable members is tapered and narrows in the direction of extension from said disc, wherein said plurality of deformable members are positioned between said rotor core and said plurality of magnets and configured to restrict movement of said plurality of magnets within said radial apertures, wherein said deformable members are configured to deform upon insertion into a cavity defined between said rotor core and said plurality of magnets.

2. The rotor assembly of claim 1, wherein said plurality of deformable members comprises:
    a first plurality of circumferentially spaced deformable members configured to restrict radial movement of said plurality of magnets; and
    a second plurality of circumferentially spaced deformable members configured to restrict circumferential movement of said plurality of magnets.

3. The rotor assembly of claim 2, wherein each deformable member of said first plurality of deformable members and said second plurality of deformable members comprises a deformable portion configured to engage said rotor core and deform upon insertion into said rotor core.

4. The rotor assembly of claim 2, wherein said first plurality of deformable members is positioned radially inward of said second plurality of deformable members.

5. The rotor assembly of claim 2, wherein said rotor core comprises a hub and wherein a first plurality of cavities are formed between said hub and each magnet of said plurality of magnets, said first plurality of deformable members configured for insertion into said first plurality of cavities.

6. The rotor assembly of claim 5, wherein said first plurality of deformable members each comprise:
    an arcuate radially inner surface comprising a deformable portion configured to engage said hub and to deform upon insertion into each of said first plurality of cavities;
    a planar radially outer surface; and
    planar circumferential opposing side surfaces.

7. The rotor assembly of claim 2, wherein each rotor pole comprises a notch defined at a center portion in opposing circumferential sides of each of said plurality of rotor poles, wherein a second plurality of cavities are defined between circumferentially adjacent sides of said rotor poles and said plurality of magnets such that said second plurality of cavities comprise said notches.

8. The rotor assembly of claim 7, wherein said second plurality of deformable members are configured for insertion into said second plurality of cavities.

9. The rotor assembly of claim 8, wherein said second plurality of deformable members each comprise a deformable portion configured to engage an adjacent rotor pole and to deform against said rotor pole upon insertion into said second plurality of cavities.

10. An end cap for use in a rotor assembly of an electric machine, the rotor assembly including a rotor core including a plurality of rotor poles alternately spaced with a plurality of openings for receiving a plurality of magnets therein, said end cap comprises:
  a disc;
  a first plurality of circumferentially spaced deformable members extending from said disc, wherein each deformable member of said first plurality of deformable members is tapered and narrows in the direction of extension from said disc, wherein said first plurality of deformable members are configured for positioning between the rotor core and the plurality of magnets to restrict radial movement of the plurality of magnets; and
  a second plurality of circumferentially spaced deformable members extending from said disc, wherein each deformable member of said second plurality of deformable members is tapered and narrows in the direction of extension from said disc, wherein said second plurality of deformable members are configured for positioning between the rotor core and the plurality of magnets to restrict circumferential movement of said plurality of magnets.

11. The rotor assembly of claim 10, wherein each deformable member of said first plurality of deformable members comprises a deformable portion configured to engage said rotor core and deform upon insertion into said rotor core.

12. The rotor assembly of claim 11, wherein said deformable portion of said first plurality of deformable members is configured to engage a hub of the rotor core.

13. The rotor assembly of claim 11, wherein said deformable portion of said second plurality of deformable members is configured to engage a rotor pole of the rotor core.

14. The rotor assembly of claim 10, wherein said first plurality of deformable members comprise a planar radially outer surface, an arcuate radially inner surface, and planar circumferential opposing side surfaces, and wherein said first plurality of deformable members comprise a deformable portion on said radially inner surface.

15. The rotor assembly of claim 10, wherein each member of the second plurality of deformable members comprises a first circumferential side surface configured to engage a magnet of the plurality of magnets and an opposing second circumferential side surface configured to engage a rotor pole adjacent said magnet, wherein said second circumferential side surface comprises a deformable portion configured to deform against said rotor pole upon insertion of said deformable member into the rotor core.

16. The rotor assembly of claim 10, wherein said first plurality of deformable members is positioned radially inward of said second plurality of deformable members.

17. A method of assembling a rotor assembly for use in a radial flux electric motor assembly, said method comprising:
  inserting a plurality of magnets into a plurality of radial apertures defined between a plurality of circumferentially spaced rotor poles of a rotor core;
  inserting a first plurality of deformable members of an end cap into a first plurality of cavities radially defined between a hub of the rotor core and the plurality of magnets, wherein each deformable member of the first plurality of deformable members is tapered and narrows in the direction of extension from a disc; and
  inserting a second plurality of deformable members of the end cap into a second plurality of cavities defined between adjacent sides of the rotor poles and the magnets, wherein each deformable member of the second plurality of deformable members is tapered and narrows in the direction of extension from a disc, wherein the first plurality of deformable members and the second plurality of deformable members are configured to deform upon insertion to restrict movement of the plurality of magnets within the radial apertures.

18. The method of claim 17, wherein inserting the first plurality of deformable members comprises inserting the first plurality of deformable members such that a deformable portion on a radially inner surface of the first plurality of deformable members is deformed by the hub upon insertion.

19. The method of claim 17, wherein inserting the second plurality of deformable members comprises inserting the second plurality of deformable members into a notch defined at a center portion in a circumferential side surface of each of the plurality of rotor poles; and wherein inserting the first plurality of deformable members comprises inserting the first plurality of deformable members such that a deformable portion on a circumferential side surface of the second plurality of deformable members is deformed by the rotor poles upon insertion.

* * * * *